Oct. 8, 1957

G. P. McMANUS 2,808,836

PEA OR BEAN SHELLER

Filed Dec. 30, 1955

INVENTOR
Grannan P. McManus.
BY Gustave Miller
ATTORNEY

Oct. 8, 1957 G. P. McMANUS 2,808,836
PEA OR BEAN SHELLER
Filed Dec. 30, 1955 2 Sheets-Sheet 2

INVENTOR
Graham P. McManus.
BY Gustave Miller
ATTORNEY

United States Patent Office 2,808,836
Patented Oct. 8, 1957

2,808,836

PEA OR BEAN SHELLER

Grannan P. McManus, Atlanta, La.

Application December 30, 1955, Serial No. 556,769

3 Claims. (Cl. 130—30)

This invention relates to a device for shelling peas, beans, and the like, and it particularly relates to such a device which can be manually manipulated without requiring any supporting attachment.

The task of shelling peas or beans by hand is a long and arduous task which has plagued the housewife as well as the commercial cook for a great many years. In order to ease this task, various mechanical shellers have been provided in the past. However, such previous shelling devices have all had various disadvantages such as being too complex and bulky to be consistently used, or were not efficient enough to adequately perform the required tasks so that it was still necessary to finish the job by hand. One of the prime disadvantages of these prior shellers was the fact that they could not be accurately enough controlled to prevent cutting into and damaging the peas within the pod.

It is one object of the present invention to provide a shelling device which quickly and effectively performs its task, although it is of simple and easily handled construction.

Another object of the present invention is to provide a shelling device which will not damage the peas within the shell during the shelling process.

Another object of the present invention is to provide a shelling device which may be operated without any outside support. Other objects of the present invention are to provide an improved shelling device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which.

Figure 1:
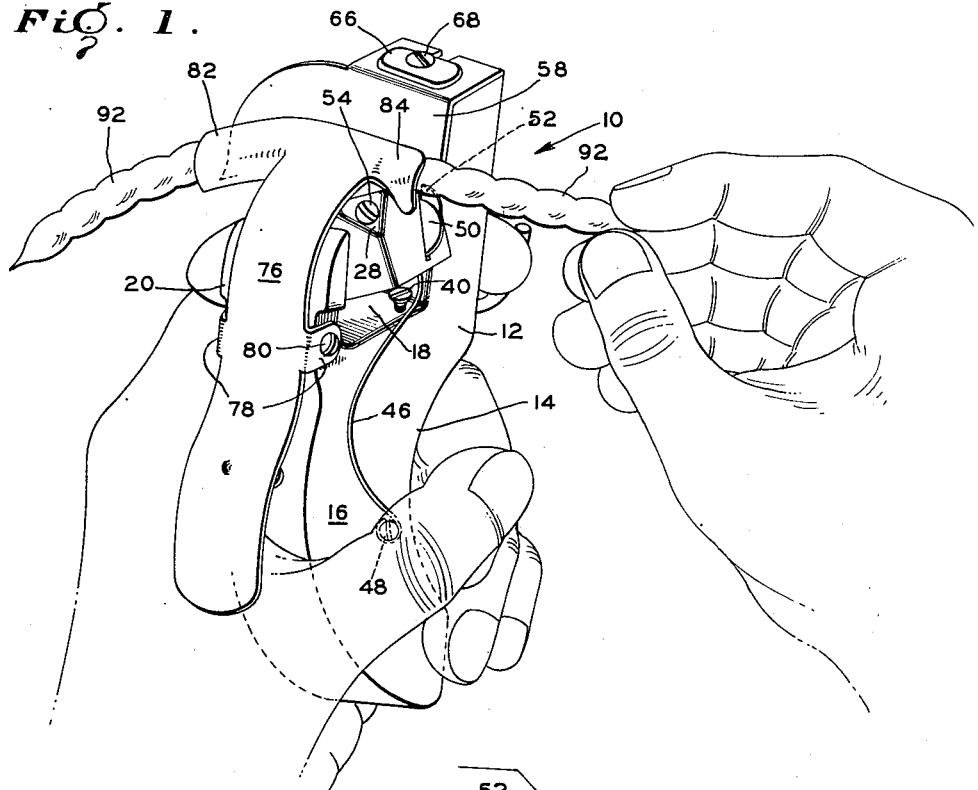
Fig. 1 is a perspective view of a shelling device, embodying the present invention, shown in use.
Figure 2:
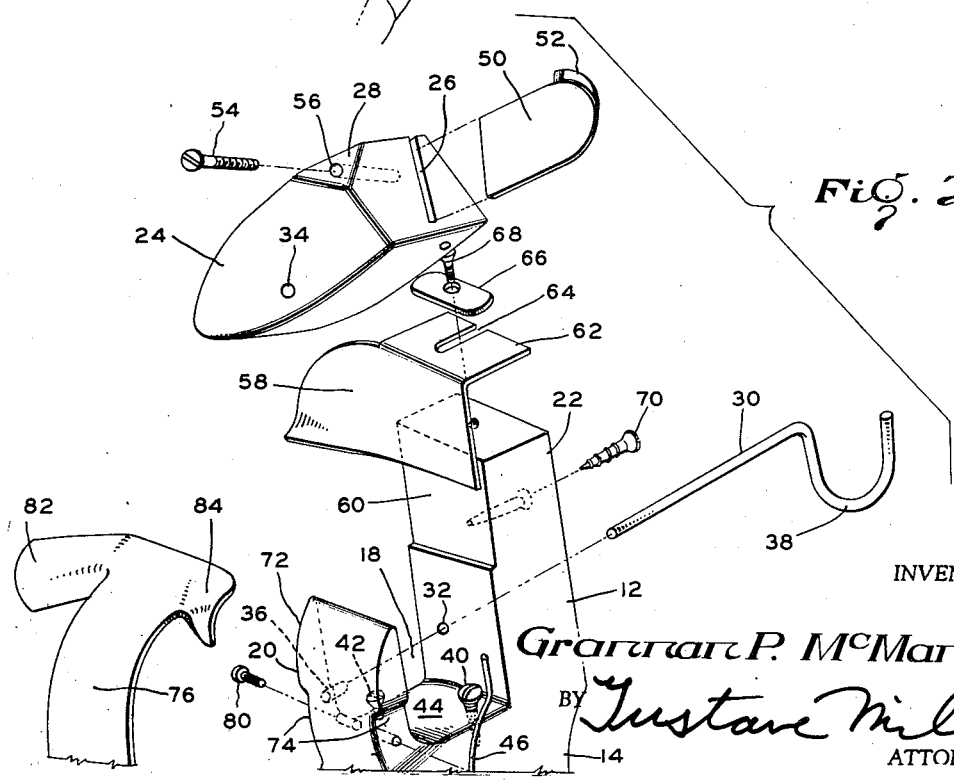
Fig. 2 is an exploded, perspective view of the device of Fig. 1.
Figure 3:
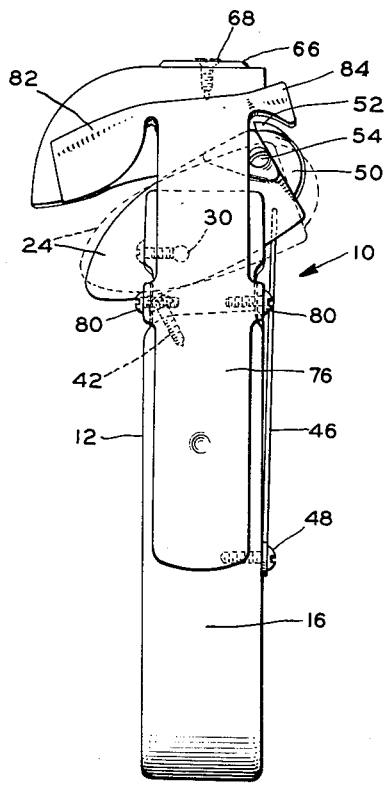
Fig. 3 is a rear elevational view of the device.
Figure 4:
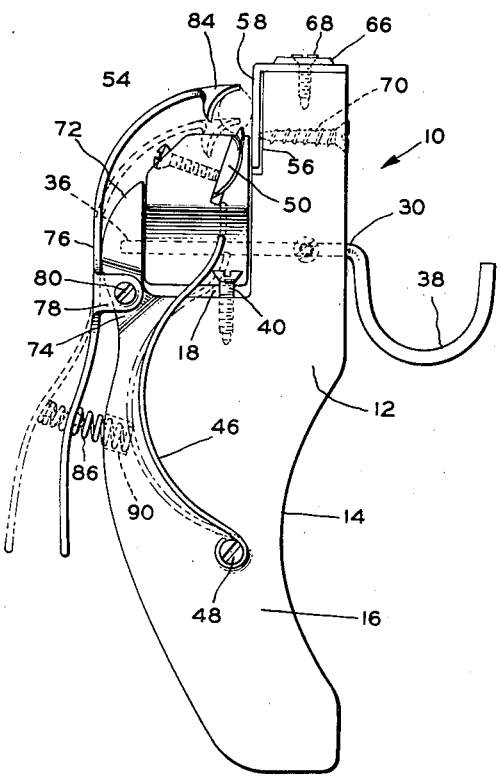
Fig. 4 is a side elevational view of the device.
Figure 5:
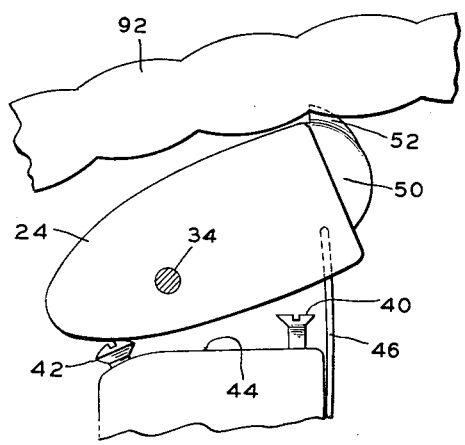
Figs. 5 and 6 are diagrammatic views showing the relative movements between the sheller blade and the pea shell.
Figure 6:
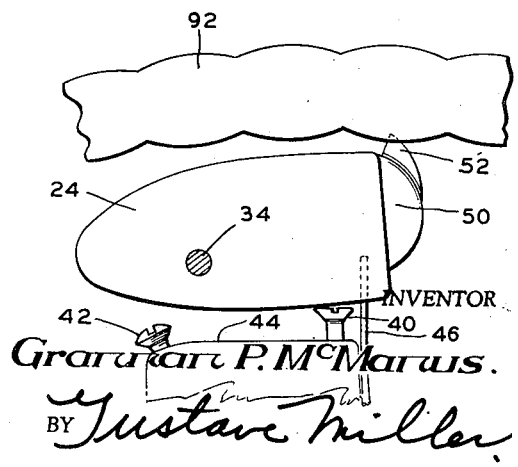

Referring now in greater detail to the drawings wherein similar reference characters refer to similar parts, there is shown a sheller, generally indicated at 10, which comprises a stock 12, made of wood, plastic, metal, or any other desirable material, and having an indented portion 14 which permits grasping of the handle portion 16.

At the upper end of the stock, there is provided a recess 18 bounded on one side by a short post 20 and, on the other side, by a high post 22. Within the recess there is releasably secured a cutting blade holder 24 having an inclined slot 26 extending from its upper surface, and a beveled edge portion 28. The holder 24 is pivotally secured in the recess by a removable shaft 30 which is inserted through an opening 32 in the post 22 and also through holes 34 in the blade head and 36 in the post 20. The hole 36 does not extend all the way through the post 20 and acts as a type of bearing for the shaft. The shaft 30 is longitudinally insertable and removable in the coinciding holes, and is provided with a hooked portion 38 which serves both as a handle and as a stop to limit longitudinal insertion of the shaft.

A pair of screws 40 and 42 are positioned in the bottom wall 44 of the recess 18 to act as opposite limit stops for the pivotal movement of the blade holder. The fact that these stops are screws provides an adjustment means for raising or lowering the stops.

A light spring 46 is connected, at its upper end, to the bottom of the head 24 and, at its lower end, to a screw 48 in the side of the stock.

Removably positioned in the inclined slot 26 of the blade holder is a blade support 50 holding a curved blade 52 in position in the slot. The blade support and blade are fixed in the slot by a set-screw 54 extending through a hole 56 in the beveled portion 28.

The blade 52 is positioned adjacent a guard plate 58 fitting in a recess 60 on the inner surface of post 22. The guard plate is provided with a top flange 62 adapted to seat on top of the post 22 when the guard plate is in the recess 60. The flange 62 has a slot 64 over which is positioned a bridge 66 which is held in place by a screw 68 extending through mating holes in the bridge member and in the top of the post 22, as well as through the slot 64. The guard plate can be adjusted laterally toward and away from the blade 52 by loosening the screw 68 and sliding the plate along the length of the slot 64. A screw 70 extends laterally through the post 22 to act as an adjustable limit stop for lateral movement of the guard plate.

The top of the short post 20 is curved, as at 72, and the bottom portion of this post is recessed on both sides, as at 74. A lever 76 is provided with a pair of ears 78 which extend around the recessed sides 74 of the post 20 and are pivotally held in place therein by screws 80 extending into the post through holes in the ears.

The top of the lever 76 is provided with a laterally extending, concavely curved, inlet guide 82 of relatively large diameter, at one side, and a concavely curved, relatively small outlet guide 84, at the opposite side. The bottom portion of the lever 76 is biased outwardly by a coil spring 86 positioned between a lug 88 on the lever and a hole 90 in the stock; and this acts to bias the guide portions 82 and 84, at the top of the lever, toward the guide plate 58 in overlying relationship to the blade.

In operation, a pea or bean shell 92 is inserted through guide 82 while it is held in outward position by pressing on the lower end of lever 76. The lever is then released to clamp the shell loosely between the guide plate and the guide. The shell is then pushed over the blade until the forward end of the shell moves through the guide 84. It is then grasped at the forward end and pulled through, as illustrated in Fig. 1. The contact between the blade and shell is just strong enough to slice through the shell without cutting the peas themselves. Any irregularities or obstructions on the shell are compensated for by the spring 46 which acts to resiliently bias the blade to follow the contour of the shell as it is pulled through the guide over the blade.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A shelling device comprising a stock, a recess at one end of said stock, a pair of posts defining said recess, one of said posts being higher than the other, a blade holder pivotally mounted in said recess between said posts, an inclined slot in said blade holder, said slot inclining toward the higher post, a blade removably positioned in said slot, a lever pivotally connected to the lower post, said lever having a portion adapted to overlie both said lower post and said blade holder, and having a lateral guide positioned to overlie said blade, means urging said guide into the overlying position relative to said blade, a guard plate on said higher post adjacent said blade, and means to resiliently urge said blade holder toward a position wherein said blade is adjacent said guard plate.

2. The device of claim 1 wherein an adjustable stop is provided at opposite sides of the bottom of said recess, said stops being arranged to limit pivotal movement of said blade holder in each direction.

3. The device of claim 1 wherein said guard plate is laterally adjustable toward and away from said blade.

References Cited in the file of this patent

UNITED STATES PATENTS

| | | |
|---|---|---|
| 2,699,806 | Gardner | Jan. 18, 1955 |
| 2,731,970 | Hughes | Jan. 24, 1956 |